United States Patent
Kobayashi

(10) Patent No.: US 6,714,733 B2
(45) Date of Patent: Mar. 30, 2004

(54) STEP MOTOR WITH INTERPOLE PAIR STABILIZING REST POSITION

(75) Inventor: Kouichi Kobayashi, Tokyo (JP)

(73) Assignee: Nidec Copal Corporation, Tokyo (JP)

( * ) Notice: Subject to any disclaimer, the term of this patent is extended or adjusted under 35 U.S.C. 154(b) by 0 days.

(21) Appl. No.: 10/199,513

(22) Filed: Jul. 22, 2002

(65) Prior Publication Data

US 2003/0048033 A1 Mar. 13, 2003

(30) Foreign Application Priority Data

Jul. 23, 2001 (JP) ........................................ 2001-220905

(51) Int. Cl.[7] ................................................. H02K 1/12
(52) U.S. Cl. ........................ 396/133; 396/463; 396/508; 310/77; 310/92; 310/254
(58) Field of Search ................................. 396/451, 463, 396/133, 508, 55, 85, 469, 449; 310/77, 92, 186, 254

(56) References Cited

U.S. PATENT DOCUMENTS

| | | | | |
|---|---|---|---|---|
| 3,863,084 A | * | 1/1975 | Hasebe ......................... 310/126 |
| 4,103,191 A | * | 7/1978 | Kawamura et al. ........ 310/49 R |
| 4,704,566 A | * | 11/1987 | Hirano et al. ................. 318/254 |
| 4,782,353 A | | 11/1988 | Ogihara et al. .............. 396/463 |
| 4,806,813 A | * | 2/1989 | Sumi et al. ................... 310/254 |
| 4,958,099 A | * | 9/1990 | Chigira et al. ............... 310/254 |
| 5,068,562 A | * | 11/1991 | Tagami et al. ............... 310/256 |
| 5,384,506 A | * | 1/1995 | Aoshima ..................... 310/49 R |
| 5,489,959 A | * | 2/1996 | Akada ......................... 396/508 |
| 5,926,663 A | * | 7/1999 | Suzuki ......................... 396/449 |
| 6,388,414 B1 | | 5/2002 | Kobayashi ................... 318/685 |

FOREIGN PATENT DOCUMENTS

| | | |
|---|---|---|
| JP | 55-122471 | 9/1980 |
| JP | 60-141683 | 9/1985 |
| JP | 3-116031 | 5/1991 |

* cited by examiner

Primary Examiner—Burton S. Mullins
Assistant Examiner—David W. Scheuermann
(74) Attorney, Agent, or Firm—Nixon Peabody, LLP

(57) ABSTRACT

A step motor is composed of a rotor, first and second stators, and a magnetic member. The rotor is rotatably supported and comprised of a magnet having magnetic poles magnetized in four angular sections. The first stator has a pair of counter poles disposed in opposed relation to the magnet and a coil wound around the first stator. The second stator has another pair of counter poles disposed in opposed relation to the magnet and another coil wound around the second stator. The second stator is opposite to the first stator with respect to the rotor such that the counter poles of the first and second stators surround the rotor to stepwise rotate the rotor in response to electric pulses applied to the coils of the first and second stators. The magnetic member has a pair of interpoles positioned in a middle of the first and second stators in opposed relation to the rotor such as to stabilize a rest position of the rotor, which is held when the electric pulse is not applied to the coils.

7 Claims, 10 Drawing Sheets

STEP MOTOR WITH INTERPOLE PAIR STABILIZING REST POSITION

BACKGROUND OF THE INVENTION

1. Field of the Invention

The present invention relates to a step motor for use in a driving source of palm-size products such as a camera.

2. Description of the Related Art

In general, a step motor is assembled into small apparatuses such a camera, and there has been a demand for a motor featuring a high efficiency, a low power consumption and small size, because a battery is used for a power source of the compact apparatus. Such a small step motor is disclosed for example in Japanese Patent Application Laid-Open No. 1980-122471. In the conventional step motor, a rotor is disposed in a middle of the motor set, and stators including coils are disposed in opposed relation to the rotor on left and right sides. In the step motor constituted in this manner, a magnet magnetized in four poles is used as the rotor. In a two-phases excitation driving which has been generally performed, a rotation angle per pulse is set 45 degrees. That is, an operation of intermittently repeating rotation in response to a pulse is performed, and a stop state is inserted between rotations. When the step motor having a four-pole magnetization constitution is subjected to the two-phases excitation driving, a non-stable phase and a stable phase alternately exist in the stop state. For the non-stable phase, the stop state is held while the power is supplied to the coils wound around the left and right stators. In other words, the power supply is necessary for maintaining the stop state, hence the phase is referred to as the non-stable phase. On the other hand, for the stable phase, even when the power supply to the coil is cut, the stop state can be held by magnetic equilibrium between the rotor and the surrounding stators.

The step motor having the above-described characteristics is used as a driving source, for example, of a camera lens tube. A feed amount of the lens tube is controlled in accordance with a rotation amount of the step motor, and thereby automatic focusing, zooming, and the like are performed in a constitution. When the feed amount of the lens tube is controlled in accordance with the increment or decrement of the stop position of the step motor, there is some restrictions in the driving control method of the step motor including the non-stable and stable phases in the stop state. That is, in the constitution where the power supply to the step motor is cut after the completion of the feed of the lens tube, only the stop state in which the step motor is magnetically stabilized should be used. In this case, since the non-stable phase cannot be used, it is necessary to select the stable phase, and eventually a stop control is required every two pulses. Conversely, when both the non-stable and stable phases are used in the stop control, the motor can stop at every pulse. Therefore, a resolution of lens feed amount is enhanced. However, the power needs to be supplied to the coil of the stator even after the feed of the lens tube is completed. This increases power consumption.

As means for solving the above-described restriction, a constitution using an interpole is known, and the means is disclosed, for example, in Japanese Utility Model Application Laid-Open No. 1985-141683. The interpole is disposed in opposed relation to the rotor and between the left and right stators, and thereby the stop state in the non-stable phase is magnetically stabilized. That is, the non-stable stop state which could not be stabilized unless the power supply were maintained is magnetically stabilized by the interpole even if the power supply is cut. However, in a conventional stop state stabilization constitution, a single interpole has heretofore been used. Conversely, when a magnetic effect of the interpole is excessively strong, the stop state in the stable phase is adversely influenced and becomes unstable. That is, the presence of the single interpole collapses the magnetic equilibrium between the rotor and the stators in the stable phase. On the other hand, when the magnetic effect of the single interpole is weak, the non-stable phase is insufficiently stabilized during the cutting of the power supply. There is possibility that the stop position eventually fluctuates. As described above, it is difficult to set an optimum magnetic effect of the interpole in the conventional single interpole constitution, and the constitution is insufficient for the stabilization of the stop state of the rotor.

SUMMARY OF THE INVENTION

In consideration of the above-described conventional technical problem, an object of the present invention is to further stabilize a stop state of a step motor. To achieve the object, the following means has been developed. That is, according to the present invention, there is provided a step motor comprising a rotor which is rotatable supported and which is comprised of a magnet having magnetic poles magnetized in four angular sections, a first stator which has a pair of counter poles disposed in opposed relation to the magnet and a coil wound around the first stator, a second stator which has another pair of counter poles disposed in opposed relation to the magnet and another coil wound around the second stator, the second stator being opposite to the first stator with respect to the rotor such that the counter poles of the first and second stators surround the rotor to stepwise rotate the rotor in response to electric pulses applied to the coils of the first and second stators, and a magnetic member having a pair of interpoles positioned in a middle of the first and second stators in opposed relation to the rotor such as to stabilize a rest position of the rotor, which is held when the electric pulse is not applied to the coils.

Preferably, said pair of interpoles are spaced apart from each other by an angle corresponding to half of an angular span occupied by one magnetic pole of the magnet. Further, said magnetic member is composed of a magnetic metal material and shaped into a central section and a pair of leg sections extending radially from the central section and electing to define the pair of the interpoles, the central section being registered with a rotation axis of the rotor such that the leg sections can be positioned in opposed relation to the rotor.

According to the present invention, the interpole disposed in opposed relation to the magnet of the rotor has a two-legs construction. In other words, a pair of interpoles are used, not the single interpole. An angle relation of the interpoles defined by two legs is set to half of the angle range occupied by one magnetic pole of the magnet. The interpoles produce a magnetic effect to stabilize either of stable and non-stable phases. Even when no power is supplied to the coil, the motor can stop at the rest position. It is possible to obtain a stop stability superior to that of a conventional step motor. Since the interpole has the two-legs structure, a stop precision of the rotor magnet is stabilized. In either of non-stable and stable phases, the position of the rotor magnet does not deviate and is stabilized, even when the power supply to the stator coil is cut. In the conventional driving method of: cutting the power supply after a rotation operation, the rotor needs to be stopped every two pulses. However, according to the present invention, it is possible to execute the stop control every pulse, so that an operation time can be reduced, or a resolution of the stop position can be enhanced. Otherwise, in the conventional method, the power is supplied to the coil every pulse in order to constantly hold the stop position. However, according to the present invention, since the two-legs constitution is used, the retention of the power supply is unnecessary, and it is possible to remove the power from the coil even in the non-stable phase. Therefore, the power consumption can be reduced.

DESCRIPTION OF THE PREFERRED EMBODIMENT

Figure 1:
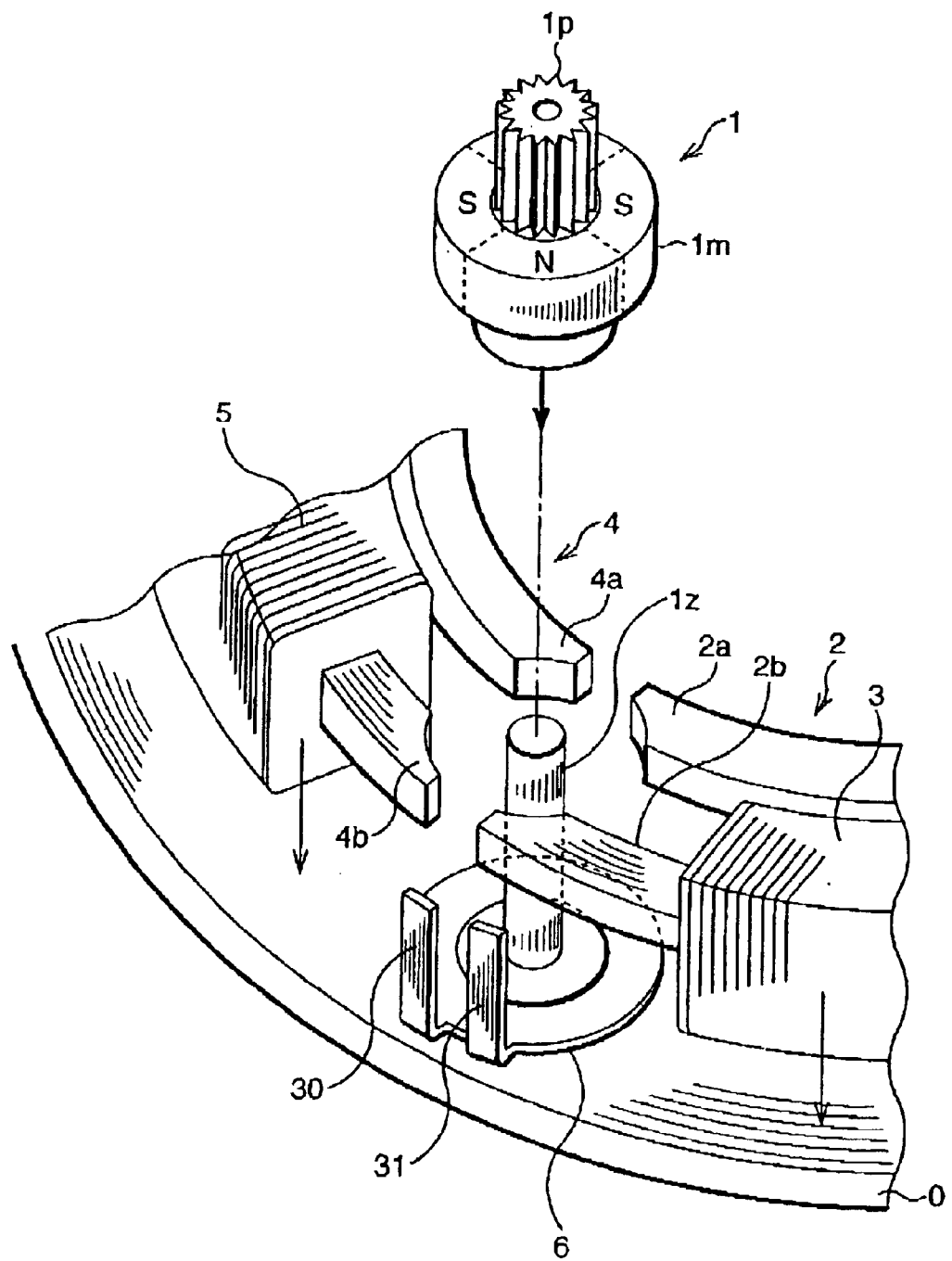
FIG. 1 is a schematic exploded perspective view of a step motor according to the present invention.

An embodiment of the present invention will be described hereinafter in detail with respect to the drawings. FIG. 1 is a partial exploded perspective view showing an entire constitution of a step motor according to the present invention. As shown in FIG. 1, the step motor is constituted of a rotor 1 and two stators 2 and 4, and is mounted on a substrate 0. The rotor 1 is rotatably supported by a rotation shaft 1z disposed on the substrate 0, and is constituted of a magnet 1m including magnetic poles magnetized in four poles of N, S, N, S. Additionally, a pinion 1p for extracting a rotation force of the rotor 1 to the outside is attached to the same shaft in the upper part of the magnet 1m. On the other hand, the first stator 2 includes a pair of counter poles 2a, 2b disposed in opposed relation to the magnet 1m, and a coil 3 wound therearound. The second stator 4 includes a pair of counter poles 4a, 4b disposed in opposed relation to the magnet 1m, and a coil 5 wound therearound, and is positioned on a side opposite to the first stator 2 with respect to the rotor 1.

As a characteristic matter, a magnetic member 6 including a pair of interpoles 30, 31 having a two-legs constitution is assembled in the substrate 0. The pair of interpoles 30, 31 are positioned in a middle of the first and second stators 2, 4 and disposed in opposed relation to the rotor 1. The pair of interpoles 30, 31 are spaced apart from each other by an angle (45 degrees) corresponding to half of an angle range (90 degrees) occupied by one magnetic pole of the magnet 1m. The magnetic member 6 has an annular central section and two leg sections, and is integrally processed by a magnetic metal material, and attached to the substrate 0 in registration with of the rotation shaft 1z of the rotor 1.

Figure 2:
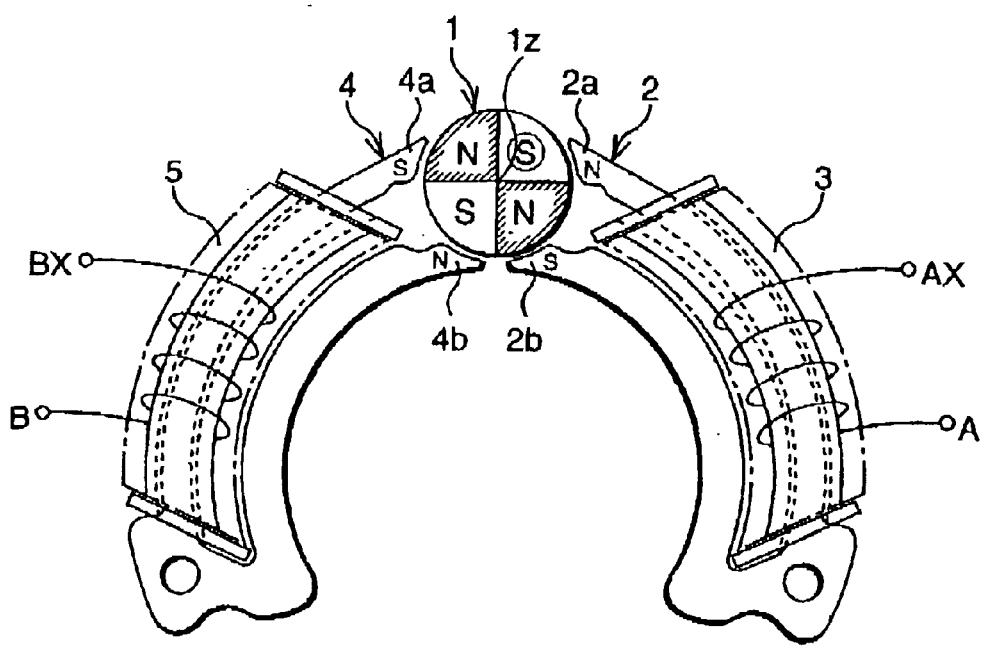
FIGS. 2(1) and 2(2) are a plan view showing a basic constitution of the step motor shown in FIG. 1.
Figure 2:
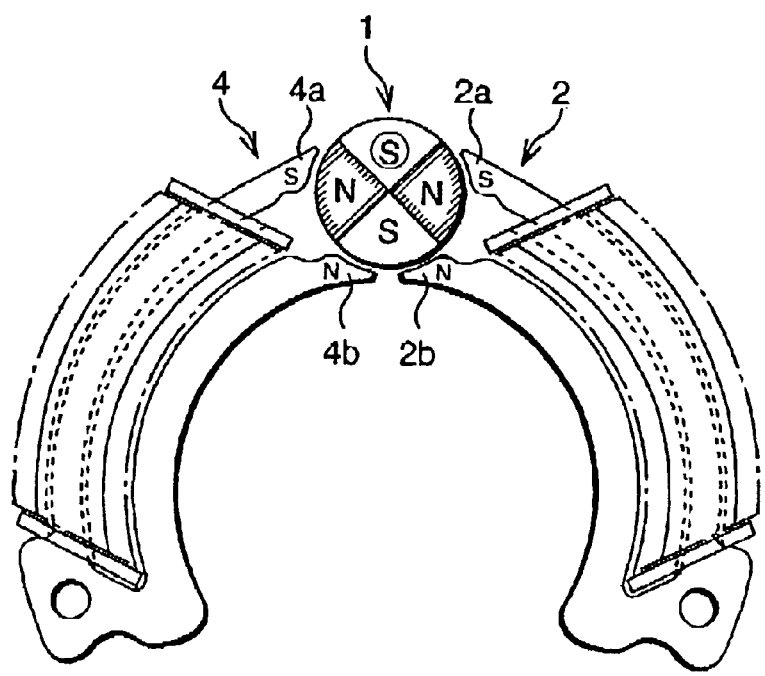

FIG. 2 is a schematic plan view of the step motor shown in FIG. 1. Additionally, only the basic constitution excluding the interpoles is shown. FIG. 2(1) shows a stop state in a stable phase, and FIG. 2(2) shows a another stop state in a non-stable phase. As shown in FIG. 2, the magnet of the rotor 1 is magnetized in four poles. The first stator 2 positioned on the right side of the rotor 1 includes a pair of counter poles 2a, 2b, and the coil 3 wound therearound. A pair of terminals of the coil 3 are denoted with A and AX. The pair of counter poles 2a, 2b are apart from each other by the angle occupied by one magnetic pole of the magnet of the rotor 1. The second stator 4 positioned on the left side of the rotor 1 is opposite and symmetric with respect to the first stator 2, and includes a pair of counter poles 4a, 4b, and the coil 5 wound therearound. The terminals of the coil 5 are denoted with B and BX. The pair of counter poles 4a, 4b are apart from each other by the angle occupied by one magnetic pole of the magnet of the rotor 1. Moreover, the counter pole 2b of the first stator 2 is spaced apart from the counter pole 4b of the second stator 4 by an angle corresponding to half of the angle occupied by one magnetic pole of the magnet of the rotor 1. The rotor 1 is constituted rotationally around the rotation shaft 1z as a rotation axis. In the stop state shown in (1), the rotor 1 is positioned between the right stator 2 and left stator 4, magnetic equilibrium is kept, and the stable phase is achieved. That is, the illustrated stop position of the rotor can be held without supplying power to the coils 3 and 5.

In the state shown in (1), when the power is supplied to the coils 3, 5, the stators 2, 4 are excited. As a result, the counter pole 2a is excited in the N pole, and the counter pole 2b is excited in the S pole. Moreover, the counter pole 4a of the stator 4 is excited in the S pole, and the counter pole 4b is excited in the N pole. In this case, the respective magnetic poles of the rotor magnet magnetized in four poles and the respective four counter poles of the stators attract one another. Therefore, even after the power supply starts, the shown stop positional relation is held.

Subsequently, when the power is supplied to the coil 3 in a reverse direction, the counter pole 2a of the stator 2 changes to the S pole, and the counter pole 2b changes to the N pole. Thereby, the attraction state with the rotor 1 changes to a repelling state. To achieve a magnetic balance with the counter pole of the second stator 4 on the opposite side, the rotor 1 rotates by 45 degrees in a counterclockwise direction, then reaches the state (2) and stops. To continue the rotation from the stop state shown in (2), the power supply to the coil 5 may be reversed. Thereafter, when the power supply to the coil 3 is reversed, the rotation intermittently continues. When the power supplies to the coils 3, 5 are alternately reversed in this manner, a step rotation is continued by a unit of 45 degrees.

In the state (1), the four poles of the rotor magnet and the four counter poles of the stators 2, 4 are positioned in such a manner that S/N poles are disposed in opposed relation to each other. The magnetic stable state is obtained. In this case, even when the power supply to the coils 3, 5 is cut, the stop position can be held, and this is referred to as the stable phase. On the other hand, in the state shown in (2), as described above, a position is stepwise advanced such that the rotor 1 rotates by one step from the state (1). A magnetic balance is established between the rotor 1 and stators 2, 4. However, the balance is easily collapsed because of an dimensional error of component precision or an interval distance between the rotor magnet and the stator counter pole. When the magnetic balance collapses by external factors, the state (2) easily shifts to the state (1). Therefore, the stop state shown in (2) is referred to as the non-stable phase.

Figure 3:
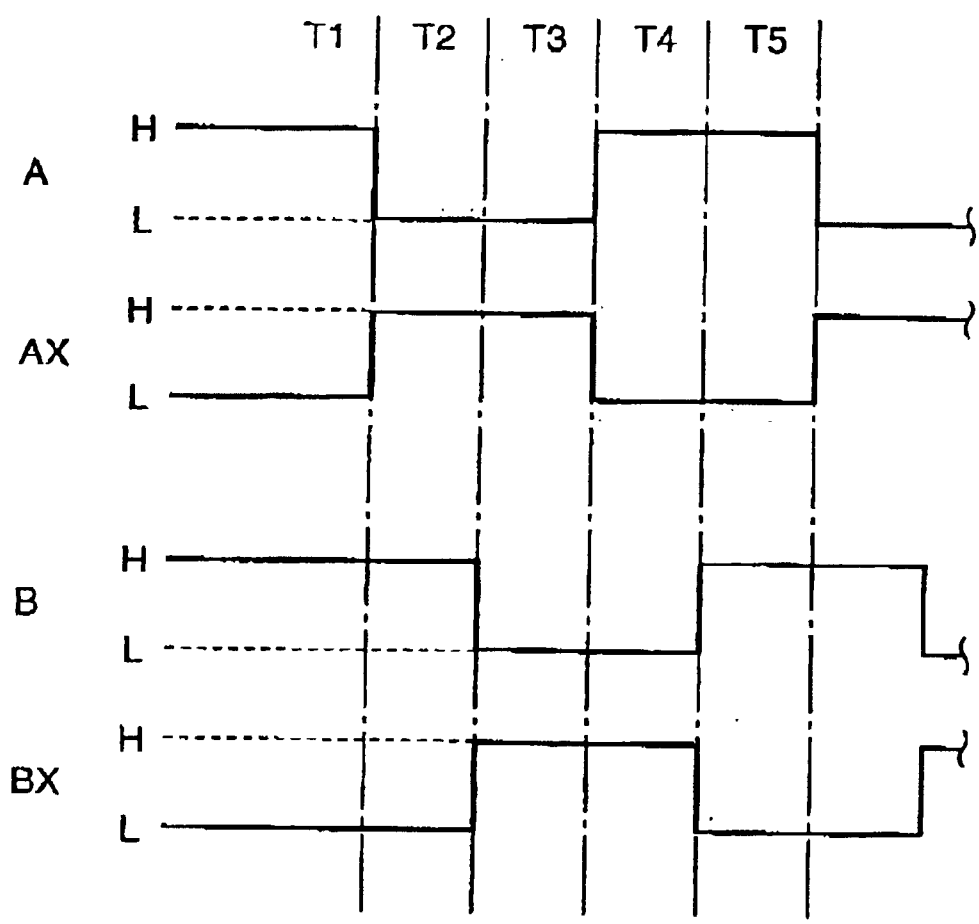
FIG. 3 is a waveform diagram for use in describing an operation of the step motor shown in FIG. 2.

A rotation operation of the step motor shown in FIG. 2 will be described in detail with reference to FIG. 3. First in a time T1, the terminal A of the coil 3 is set to a potential of H level, and the terminal AX is set to a potential of L level. Moreover, the terminal B of the coil 5 is set to the H level, and the terminal BX is set to the L level. Thereby, the counter pole 2a of the stator 2 turns to the N pole, and the counter pole 2b turns to the S pole. This is the state shown in FIG. 2(1). A magnetic attraction force acts between the rotor 1 and both of the left and right stators 2, 4, and the stable state is achieved. From this state, in the next time T2, the terminal A of the coil 3 is set to the L level and the terminal AX is set to the H level. A power supply polarity with respect to the other coil 5 is maintained as before. Thereby, one counter pole 2a of the first stator 2 turns to the S pole, the other counter pole 2b turns to the N pole, a repelling force is generated with the rotor 1, and the rotor rotates for one step by 45 degrees in a counterclockwise direction. This state is shown in FIG. 2(2). Thereafter, for further rotation of one step in time T3, the power supply polarity to the coil 3 is maintained, and the power supply polarity to the coil 5 is switched. That is, the terminal B is set to the L level and the terminal BX is set to the H level. Thereafter, in time T4, for further rotation of one step, the power supply polarity to the coil 3 is switched. Subsequently, in time T5, when the power supply polarity on the coil 5 side is switched, the rotor further rotates for one step. In this manner, eventually the rotor rotates for four steps to the time T5, and the power supply polarity to the coils 3, 5 returns to the state similar to that of the time T1. Thereafter, when the two-phases excitation driving is repeated, the rotor rotates every 45 degrees.

Figure 4:
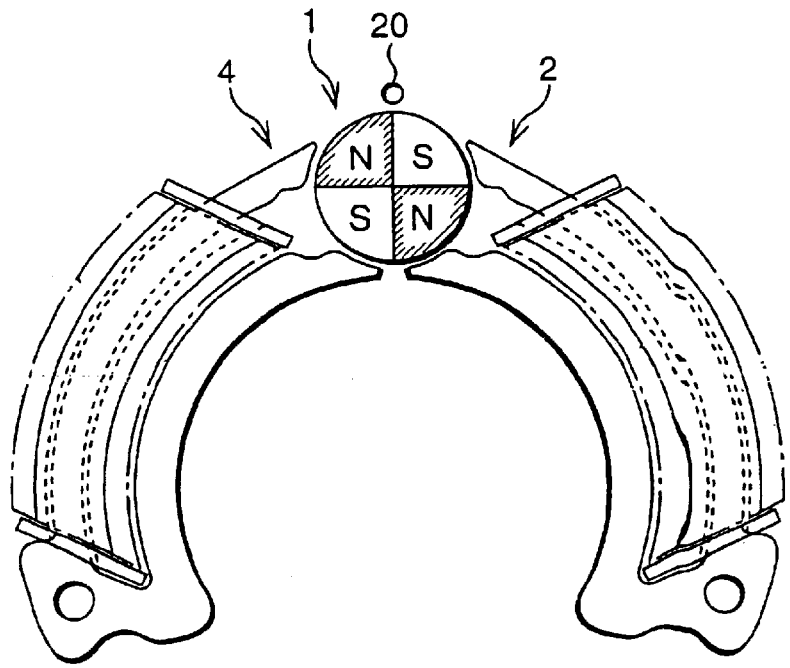
FIGS. 4(1) and 4(2) are a plan view showing a reference example of the step motor.
Figure 4:
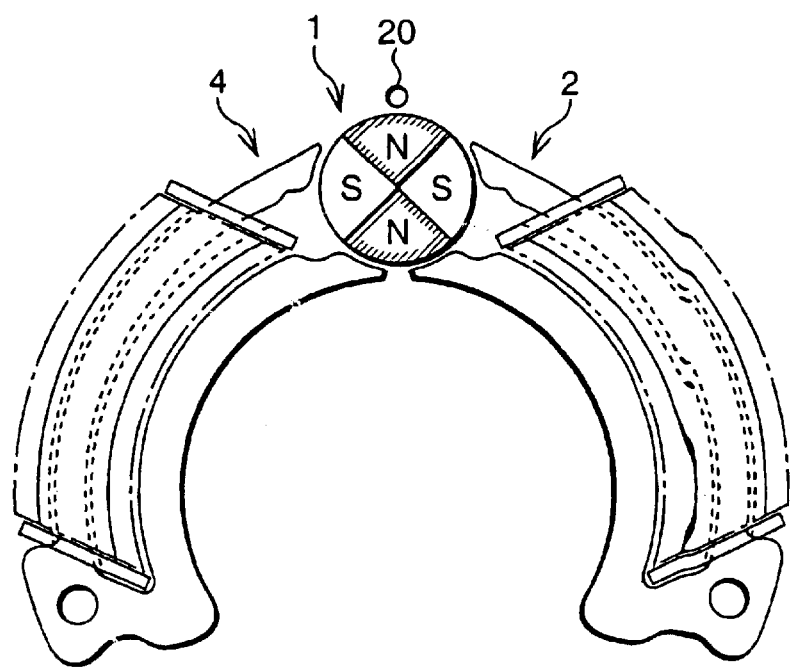

FIG. 4 is a schematic view showing a reference example of the step motor. For ease of understanding, a part corresponding to that of the constitution shown in FIG. 2 is denoted with the corresponding reference numerals. In the reference example, to stabilize the stop position of the rotor 1, a single interpole 20 is disposed. The interpole 20 is disposed in opposed relation to the rotor 1 between a pair of stators 2, 4. However, a main purpose of the interpole 20 is to smoothly perform the rotation operation of the rotor 1, and the interpole is not suitable for stabilizing the stop position during the absence of the power supply. That is, in the stop state of the stable phase shown in FIG. 4(1), the single interpole 20 is just positioned in registration with a boundary of one magnetized pole N and the other magnetized pole S of the rotor magnet, and a magnetic unstable factor is fielded. That is, attraction into any pole easily occurs because of the processing precision error of a component. As a result, the state easily shifts to another state shown in FIG. 4(2). In other words, when the single interpole 20 is disposed, the stop state shown in (2) conversely turns to the magnetic stable phase. Moreover, even if an interval between the interpole 20 of the magnet of the rotor 1 is set to be optimum in order to prevent the above-described disadvantage from occurring, the optimum state is not assured in the state (2). There is possibility that the stop state (2) shifts to the stop state (1).

Figure 5:
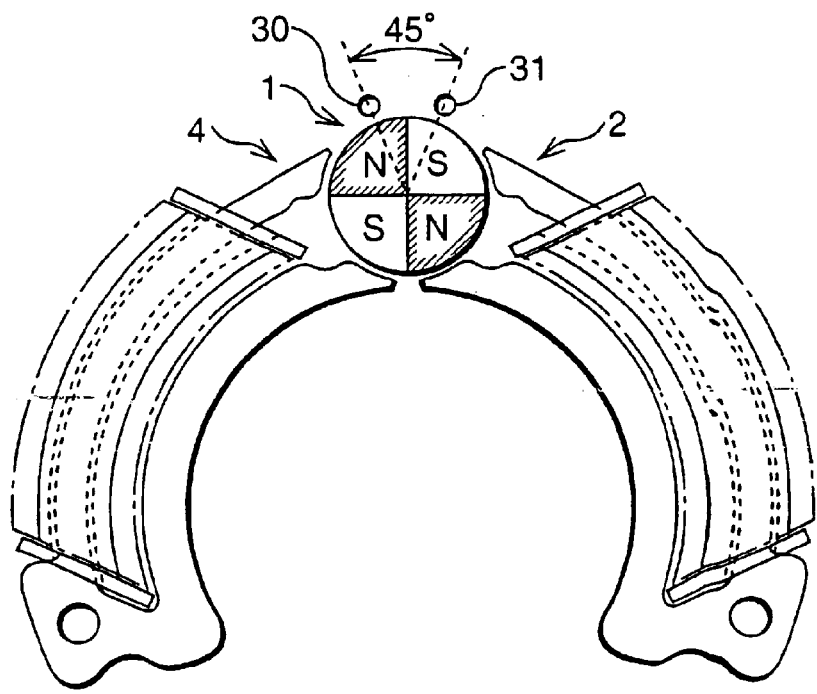
FIGS. 5(1) and 5(2) are a schematic plan view of the step motor according to the present invention shown in FIG. 1.
Figure 5:
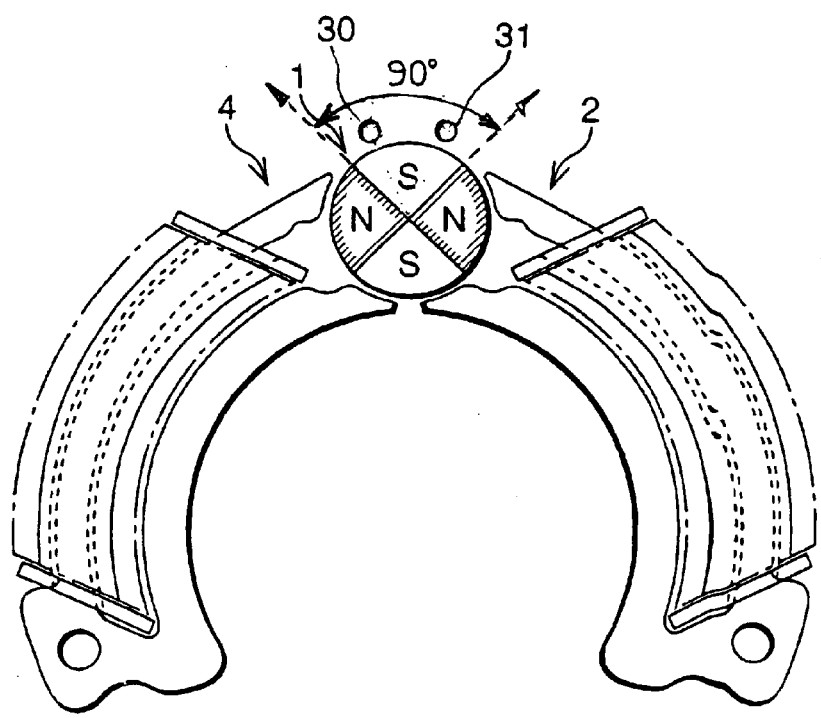

FIG. 5 is a schematic plan view of the step motor according to the present invention shown in FIG. 1 the only exception being that the interpoles 30, 31 are alternatively illustrated as having circular, instead of rectangular cross sections. For ease of understanding, a part corresponding to that of the constitution shown in FIGS. 2 and 4 is denoted with the corresponding reference numerals. As described above, in the present invention, a pair of interpoles 30, 31 are disposed in opposed relation to the magnet of the rotor 1. The angle distance between the pair of interpoles 30, 31 is approximately 45 degrees as shown in FIG. 5, or half as much as the angular extent of the magnetic poles of the rotor 1, which is about 90 degrees. In this state, one interpole 30 attracts the N pole of the rotor magnet, and the other interpole 31 similarly attracts the S pole of the rotor magnet in a stable state. Therefore, the stop state (1) inherently of the stable phase can further be stabilized.

After the rotation for one step from the stop state (1), a stop state (2) is achieved. In the stop state, both of the interpoles 30, 31 attract the same S pole of the magnet. Therefore, the stop state of the rotor magnet inherently of the non-stable phase can be stabilized by two interpoles 30, 31, and the cutting of the power supply with respect to the coil can be realized. In either of the stop states (1) and (2), two interpoles 30, 31 have an effect that the position of the rotor 1 is magnetically stabilized. Therefore, even if the stabilization in the non-stable phase is regarded as important in determining the positional relation of the pair of interpoles, the stable phase is not influenced. Therefore, any stop position of the stable and non-stable phases can steadily be secured. Additionally, even when the power supply is cut in the non-stable phase, the stop position does not change.

Figure 6:
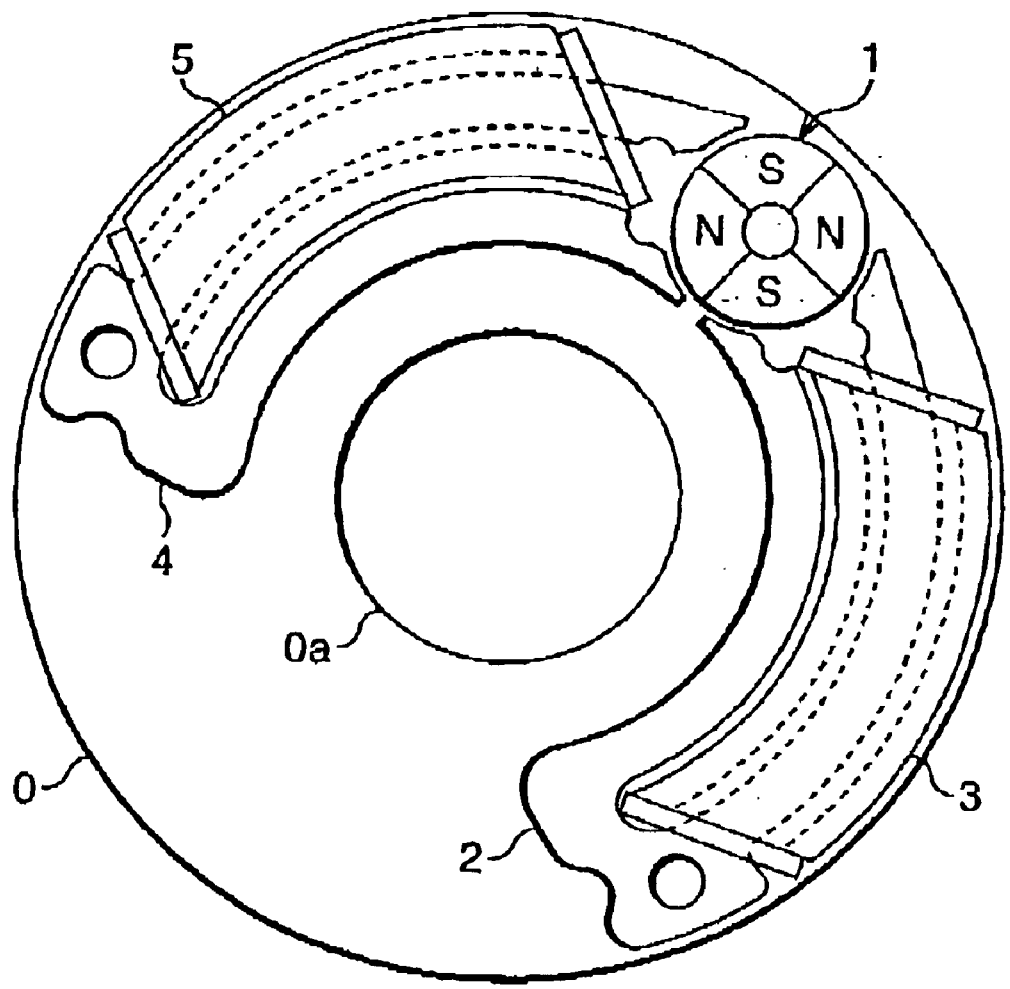
FIG. 6 is a schematic plan view of a camera lens driving apparatus utilizing the step motor according to the present invention shown in FIG. 1.

The inventive step motor can be utilized for driving a lens of a camera for zooming or auto focussing. FIG. 6 shows a concrete example of a constitution of such a lens driving apparatus of the camera. In the figure, 0 indicates a substrate with an exposure aperture 0a formed in its center. The step motor is disposed on the periphery of the substrate 0. 1 indicates a rotor in which N poles and S poles are arranged alternately at intervals of 90 degrees. 2 and 4 indicate stators that are arranged symmetrically orienting their counter poles to the rotor 1. Each stator is basically horseshoe-shaped, but to make an entire conformability better, the stators are formed mostly in a concentric circular arc shape around the exposure aperture 0a. Tip end portions of the counter poles of the stators 2 and 4 are placed at intervals of 45 degrees—90 degrees—135 degrees—90 degrees around a rotary axis of the rotor 1. The stators 2 and 4 are each wound up with coils 3 and 5. By applying pulse signals of different phases to the coils 3 and 5, the rotor 1 stepwise rotates in directions that correspond to phase order of the pulse signals.

Figure 7:
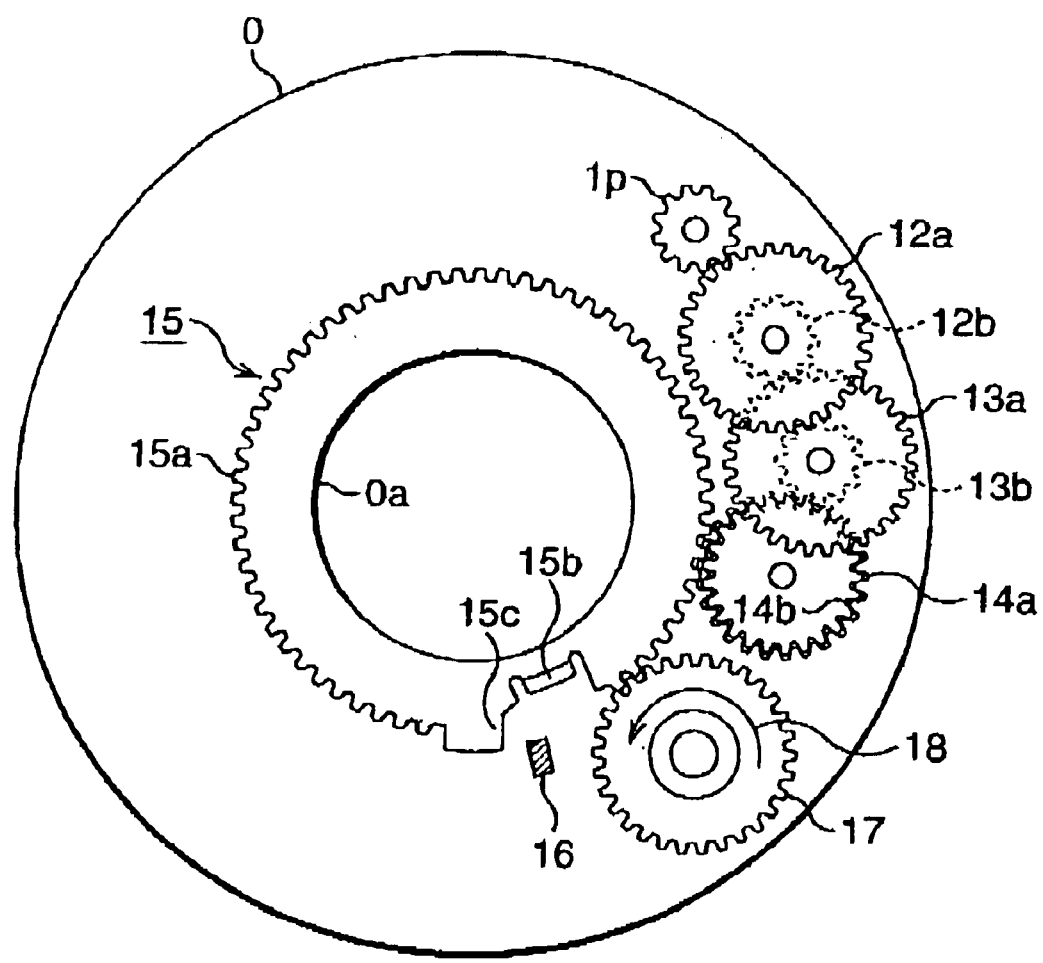
FIG. 7 is a schematic bottom view of the camera lens driving apparatus shown in FIG. 6.

FIG. 7 shows a rear face of the substrate 0, which mounts thereon a gear train and a lens operating ring 15. The rotation of the rotor 1 is transmitted via the gear train to the lens operating ring 15. 1p indicates an output pinion that is coaxial with the rotor 1. 12a and 12b, 13a and 13b, and 14a and 14b each indicate large-diameter wheels and reduced-diameter wheels, and each pair constitutes two-step cogs. Rotation of the output pinion 1p is transmitted to the large-diameter wheel 12a and coaxially rotates the reduced-diameter wheel 12b. Rotation of the reduced-diameter wheel 12b is transmitted to the large-diameter wheel 13a and coaxially rotates the reduced-diameter wheel 13b. Rotation of the reduced-diameter wheel 13b is transmitted to the reduced-diameter wheel 14b and coaxially rotates the large-diameter wheel 14a. Further, the lens operating ring 15 is formed with a rack 15a around its periphery. The lens operating ring 15 is supported to rotate around the exposure aperture 0a, and its racks 15a are geared with the large-diameter wheel 14a. A protrusion 15b formed on the lens operating ring 15 is coupled to a later-described lens frame. When the lens operating ring 15 turns to the right around the exposure aperture 0a from the state shown in FIG. 6, the lens frame is driven from the far infinity position to a close-up position. Further, 16 indicates a stopper disposed in abutment with an edge 15c of the ring 15 for regulating the lens operating ring 15 to be in an initial position. 17 indicates a feeding gear. The feeding gear 17 is geared with the racks 15a and is given a bias to turn to the left by a spring 18. It should be appreciated that, although only the force direction of the spring 18 is indicated by an arrow in the drawing, a concrete constitution of the spring is not limited as long as it is capable of providing the force in the desired direction. Therefore, the lens feeding gear 17 gives the bias force to turn the lens operating ring 15 to the right and reduces load torque caused to the stepping motor when the lens is feeding, thus enhancing a self-starting capability. It is appreciated that the force applied by the spring 18 is as strong as it does not rotate the stepping motor in a state of not being electrified.

Figure 8:
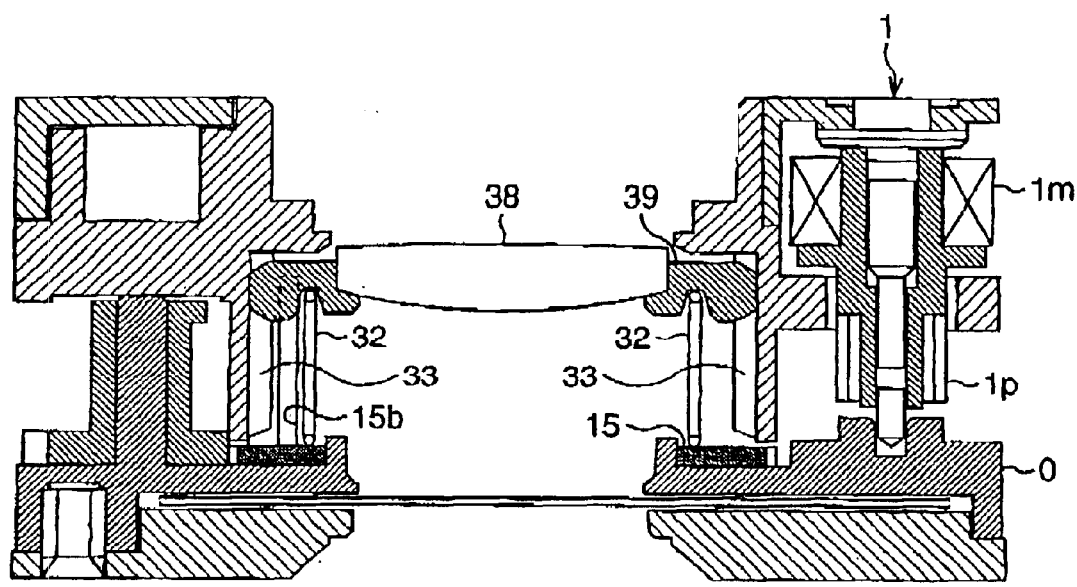
FIG. 8 is a schematic sectional view of the camera lens driving apparatus shown in FIG. 6.

FIG. 8 is a sectional view showing the relation between the lens operating ring 15 and a lens frame 39. The lens frame 39 holding a photographing lens 38 is pulled to one side by a spring 32. The protrusion 15b bending and electing from the lens operating ring 15 that is supported around the exposure aperture 0a on the substrate 0 is engaged with the lens frame 39. An outer periphery of the lens frame 39 is fit into a helicoid screw 33. Therefore, if the lens operating ring 15 is driven to turn the lens frame 39, the lens frame 39 moves in the direction of an optical axis along the helicoid screw 33.

Figure 9:
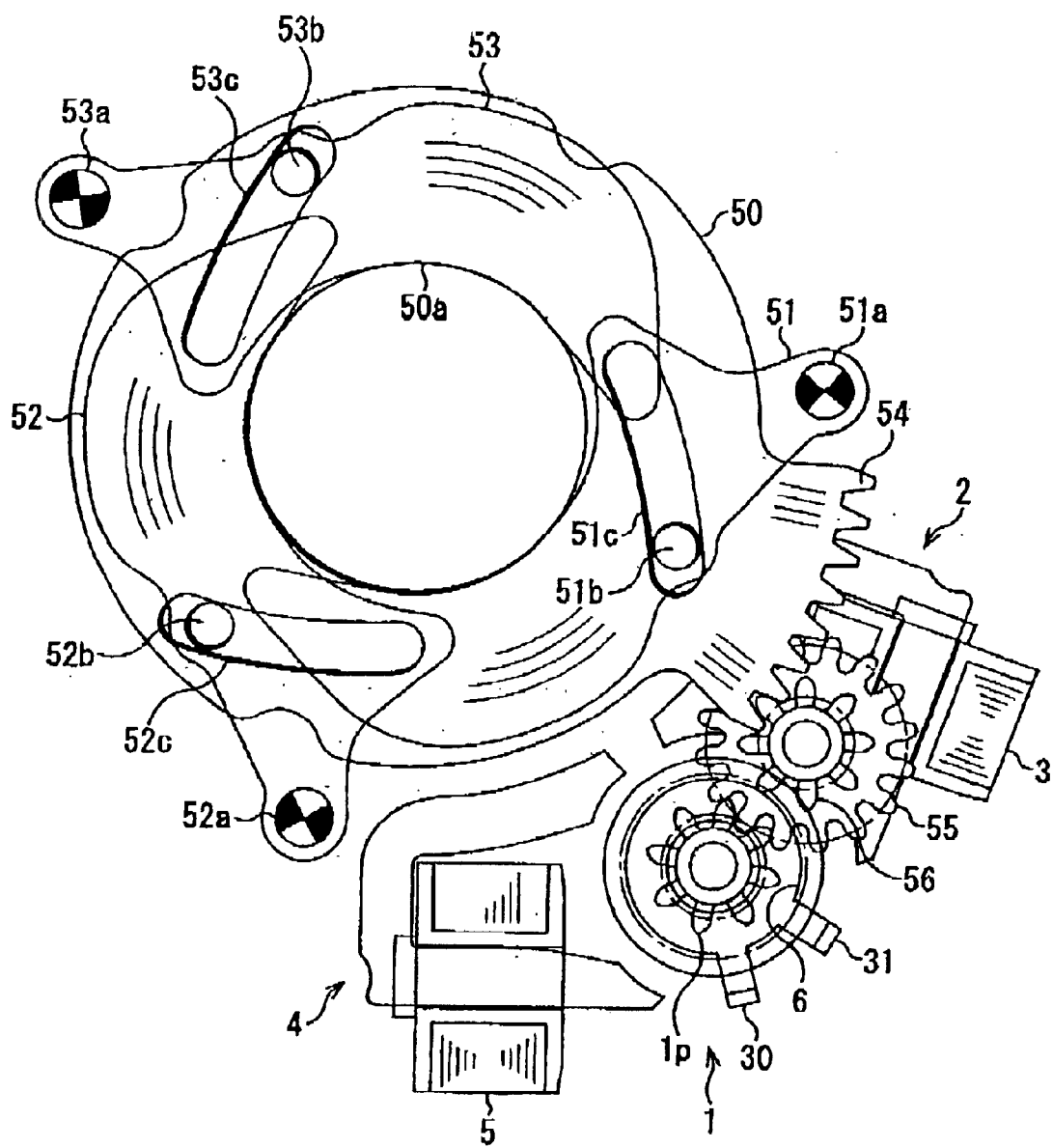
FIG. 9 is a schematic plan view of a camera diaphragm driving apparatus utilizing the step motor according to the present invention shown in FIG. 1.

FIG. 9 shows a diaphragm driving apparatus of a camera utilizing the inventive step motor. The diaphragm driving apparatus is constructed on a substrate having a lens aperture 50a. The diaphragm driving apparatus is basically composed of a diaphragm disposed over the lens aperture 50a driveably to set an effective diameter of the lens aperture, and a driving mechanism being disposed on the substrate and including a step motor for driving the diaphragm.

Specifically, the diaphragm is composed of three pieces of diaphragm blades 51, 52 and 53. These diaphragm blades 51, 52 and 53 are disposed on the substrate and engaged with a drive ring 50. The first diaphragm blade 51 is pivotally supported on the substrate around a pivot pin 51a. The first diaphragm blade 51 has a cam pin 51b, which is engaged with a cam recess 51C formed in the drive ring 50 to define a cam link. The second diaphragm blade 52 and the third diaphragm 53 have the same structure as the first diaphragm 51. When the drive ring 50 rotates counterclockwise as shown in FIG. 9, the diaphragm blades 51–53 pivot also counterclockwise around the respective pivot pins 51a–53a through the cam link, thereby escaping from the lens aperture 50a.

The step motor has a pinion 1p for outputting a drive torque. The drive torque is transmitted to the drive ring 50 through a gear train, which is comprised of a gear 55 coupled with the pinion 1p, another pinion 56 coaxially integrated with the gear 55 and a rack 54 formed on the periphery of the drive ring 50 and engaged with the pinion 56.

The step motor is comprised of a rotor 1 integral with the pinion 1p, a first stator 2, a second stator 4 and a magnetic member 6. The rotor 1 is rotatably supported and comprised of a magnet having magnetic poles magnetized in four angular sections. The first stator 2 has a pair of counter poles disposed in opposed relation to the magnet and a coil 3 wound around the first stator 2. The second stator 4 has another pair of counter poles disposed in opposed relation to the magnet and another coil 5 wound around the second stator 4. The second stator 4 is opposite to the first stator 2 with respect to the rotor 1 such that the counter poles of the first stator 2 and second stator 4 surround the rotor 1 to stepwise rotate the rotor 1 in response to electric pulses applied to the coils 3 and 5 of the first and second stators. The magnetic member 6 has a pair of interpoles 30 and 31 positioned in a middle of the first stator 2 and the second stator 4 in opposed relation to the rotor 1 such as to stabilize a rest position of the rotor 1 for securing the setting of the diaphragm even after the electric pulse is removed from the coils 3 and 5.

Figure 10:
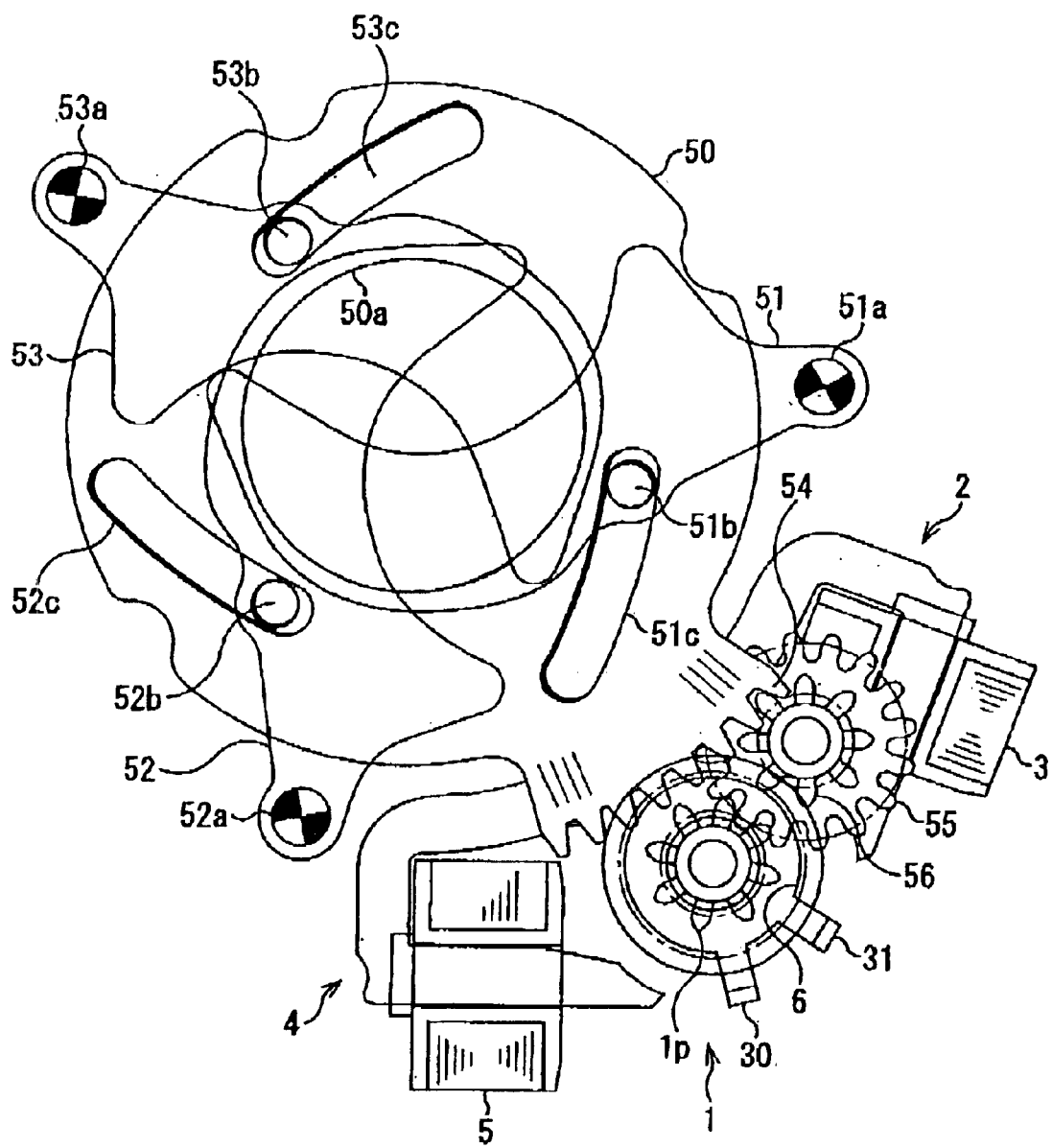
FIG. 10 is another schematic plan view of the camera diaphragm driving apparatus.

FIG. 10 shows another state of the diaphragm, in which the three diaphragm blades 51–53 enter into the lens aperture 50a to limit the effective diameter of the lens aperture 50a. Specifically, when the drive ring 50 rotates clockwise as shown in FIG. 10, the diaphragm blades 51–53 pivot also clockwise around the respective pivot pins 51a–53a through the cam link, thereby advancing into the lens aperture 50a. The rotation of the drive ring 50 is effectuated by the drive torque of the step motor. The step motor is controlled to set the diaphragm at an optimal diameter for exposure operation of the camera.

As described above, according to the present invention, one pair of interpoles are disposed in the middle of the first and second stators in opposed relation to the rotor. Thereby, the power supply to the coil can be cut even with the stop every step, and the stop position precision is not impaired. Therefore, as compared with the conventional art, the operation time can be reduced and the resolution can be enhanced. Furthermore, since the power supply can be cut, the power consumption can be reduced. Additionally, in the present embodiment, the pair of interpoles are formed by a common magnetic member, but the present invention is not limited to this. One pair of interpoles may be formed of separate magnetic members. Moreover, in the embodiment of the present invention, the angle interval of the pair of interpoles is set to approximately 45 degrees, but the present invention is not limited to this. The angle interval of the pair of interpoles can appropriately be set in a range where the position relation of the rotor and interpole shown in FIG. 5 is established.

What is claimed is:

1. A step motor comprising:
   a rotor which is rotatably supported and which is comprised of a magnet having magnetic poles magnetized in four angular sections;
   a first stator which has a pair of counter poles disposed in opposed relation to the magnet and a coil wound around the first stator;
   a second stator which has another pair of counter poles disposed in opposed relation to the magnet and another coil wound around the second stator, the second stator being opposite to the first stator with respect to the rotor such that the counter poles of the first and second stators surround the rotor to stepwise rotate the rotor in response to electric pulses applied to the coils of the first and second stators; and
   a magnetic member having a pair of spaced apart interpoles positioned in a middle of the first and second stators in opposed relation to the rotor wherein, in a first stop state of the rotor, each of said interpoles attracts a different magnetic pole of the rotor, and in a second stop state of the rotor, both of said interpoles attract a same single magnetic pole of the rotor to stabilize a rest position of the rotor, which is held when the electric pulse is not applied to the coils.

2. The step motor according to claim 1, wherein said pair of interpoles are spaced apart from each other by an angle corresponding to half of an angular span occupied by one magnetic pole of the magnet.

3. The step motor according to claim 1, wherein said magnetic member is composed of a magnetic metal material and shaped into a central section and a pair of leg sections extending radially from the central section and electing to define the pair of the interpoles, the central section being registered with a rotation axis of the rotor such that the leg sections can be positioned in opposed relation to the rotor.

4. A lens driving apparatus of a camera comprising:

a substrate having an aperture passing therethrough an optical axis;

a lens mounted on the substrate to undergo a linear movement along the optical axis;

a step motor mounted on the substrate to undergo a rotational movement; and a transmission mechanism for transmitting the rotational movement of the step motor to the linear movement of the lens so as to position the lens, wherein the step motor comprises:

a rotor which is supported to undergo the rotational movement and which is comprised of a magnet having magnetic poles magnetized in four angular sections:

a first stator which has a pair of counter poles disposed in opposed relation to the magnet and a coil wound around the first stator;

a second stator which has another pair of counter poles disposed in opposed relation to the magnet and another coil wound around the second stator, the second stator being opposite to the first stator with respect to the rotor such that the counter poles of the first and second stators surround the rotor to stepwise effect the rotational movement of the rotor in response to electric pulses applied to the coils of the first and second stators; and a magnetic member having a pair of interpoles positioned in a middle of the first and second stators in opposed relation to the rotor wherein, in a first stop state of the rotor, each of said interpoles attracts a different pole of the rotor, and in a second stop state of the rotor, both of said interpoles attracts a same single magnetic pole of the rotor to stabilize a rest position of the rotor for securing the positioning of the lens even after the electric pulse is removed from the coils.

5. The lens driving apparatus according to claim 4, wherein said pair of interpoles are spaced apart from each other by an angle corresponding to half of an angular span occupied by one magnetic pole of the magnet.

6. A diaphragm driving apparatus of a camera comprising:

a substrate having a lens aperture; a diaphragm disposed over the lens aperture driveably to set an effective diameter of the lens aperture; and a driving mechanism being disposed on the substrate and including a step motor for driving the diaphragm, wherein the step motor comprises:

a rotor which is rotatably supported and which is comprised of a magnet having magnetic poles magnetized in four angular sections;

a first stator which has a pair of counter poles disposed in opposed relation to the magnet and a coil wound around the first stator;

a second stator which has another pair of counter poles disposed in opposed relation to the magnet and another coil wound around the second stator, the second stator being opposite to the first stator with respect to the rotor such that the counter poles of the first and second stators surround the rotor to stepwise rotate the rotor in response to electric pulses applied to the coils of the first wad second stator; and a magnetic member having a pair of interpoles positioned in a middle of the first and second stators in opposed relation to the rotor wherein, in a first stop state of the rotor, each of said interpoles attracts a different pole of the rotor, and in a second stop state of the rotor, both of said interpoles attracts a same single magnetic pole of the to stabilize a rest position of the rotor for securing the setting of the diaphragm even after the electric pulse is removed from the coils.

7. The diaphragm driving apparatus according to claim 6, wherein said pair of interpoles are spaced apart from each other by an angle corresponding to half of an angular span occupied by one magnetic pole of the magnet.

* * * * *